(12) United States Patent
Han

(10) Patent No.: US 9,661,196 B2
(45) Date of Patent: May 23, 2017

(54) CAMERA MODULE

(71) Applicant: LG INNOTEK CO., LTD., Seoul (KR)

(72) Inventor: Kwang Joon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/398,899

(22) PCT Filed: Mar. 26, 2013

(86) PCT No.: PCT/KR2013/002485
§ 371 (c)(1),
(2) Date: Nov. 4, 2014

(87) PCT Pub. No.: WO2013/168892
PCT Pub. Date: Nov. 14, 2013

(65) Prior Publication Data
US 2015/0116591 A1 Apr. 30, 2015

(30) Foreign Application Priority Data

May 7, 2012 (KR) .................. 10-2012-0047958

(51) Int. Cl.
*H04N 5/225* (2006.01)
*G03B 5/00* (2006.01)
(52) U.S. Cl.
CPC ............ *H04N 5/2253* (2013.01); *G03B 5/00* (2013.01); *H04N 5/2254* (2013.01);
(Continued)

(58) Field of Classification Search
CPC .. H04N 5/2253; H04N 5/2254; H04N 5/2257; G03B 2205/0007;
(Continued)

(56) References Cited

U.S. PATENT DOCUMENTS 8,054,369 B2 * 11/2011 Tseng .................... G02B 7/022
348/335
8,098,284 B2 * 1/2012 Ushijima ............. H04N 5/2253
348/188

(Continued)

FOREIGN PATENT DOCUMENTS

KR  10-0919118 B1   9/2009
KR  10-2011-0065051 A   6/2011
(Continued)

*Primary Examiner* — Lin Ye
*Assistant Examiner* — Chriss Yoder, III
(74) *Attorney, Agent, or Firm* — Birch, Stewart, Kolasch & Birch, LLP

(57) ABSTRACT

An exemplary embodiment of the present invention relates to a camera module configured to prevent a warp of an optical axis of a lens holder, the camera module including a PCB (Printed Circuit Board) mounted with an image sensor, a base, a first lens holder arranged at an upper surface of the base and including at least one or more lens modules therein, a second lens holder forming an outer cover of the first lens holder, and an actuator concentrically arranged with an optical axis of the lens module for adjusting a focus of an image captured by the image sensor.

18 Claims, 2 Drawing Sheets

(52) U.S. Cl.
CPC ... *H04N 5/2257* (2013.01); *G03B 2205/0007* (2013.01); *G03B 2205/0061* (2013.01)

(58) Field of Classification Search
CPC .............. G03B 2205/0061; G03B 5/00; G02B 13/001–13/009
USPC .................................. 348/335, 345, 373, 375
See application file for complete search history.

(56) References Cited

U.S. PATENT DOCUMENTS

| | | | | |
|---|---|---|---|---|
| 8,100,592 B2* | 1/2012 | Craen | ....................... | G02B 3/14 359/666 |
| 8,159,595 B2* | 4/2012 | Shiraishi | ........... | H01L 27/14618 348/340 |
| 8,411,193 B2* | 4/2013 | Chiu | ........................ | G02F 1/29 348/335 |
| 2008/0100920 A1* | 5/2008 | Nakai | .................. | G02B 26/124 359/641 |
| 2009/0278978 A1* | 11/2009 | Suzuki | ..................... | G02B 7/08 348/345 |
| 2010/0232043 A1* | 9/2010 | Hishinuma | ........ | G02B 26/0858 359/824 |
| 2011/0134303 A1 | 6/2011 | Jung et al. | | |
| 2012/0092543 A1* | 4/2012 | Afshari | ................. | H04N 5/2254 348/335 |
| 2012/0113536 A1* | 5/2012 | Huang | ..................... | G02B 7/08 359/824 |
| 2012/0120298 A1* | 5/2012 | Chiu | ........................ | G02B 3/14 348/335 |
| 2012/0140101 A1* | 6/2012 | Afshari | ................. | H04N 5/2257 348/308 |
| 2012/0200764 A1* | 8/2012 | Afshari | ................ | H04N 5/2254 348/345 |
| 2012/0218450 A1* | 8/2012 | Pavithran | ............. | H04N 5/2257 348/296 |

FOREIGN PATENT DOCUMENTS

KR 10-2011-0071550 A 6/2011
WO WO 2008/096455 A1 6/2008

* cited by examiner

CAMERA MODULE

TECHNICAL FIELD

The teachings in accordance with exemplary embodiments of this invention relate generally to a camera module.

BACKGROUND ART

Recently, demands on a small-sized compact camera module are on the increase for use in various multimedia fields including notebook type personal computers, camera phones, PDAs (Personal Digital Assistants), smart phones and toys, and in image input equipment including monitoring cameras and information terminals for video tape recorders. Particularly, the trend is to develop a small sized camera module in response to increased demand by consumers preferring a smart phone of miniaturized design to that of large sized design.

The camera module is generally manufactured using an image sensor or a photoelectric conversion device of a CCD (Charge Coupled Apparatus) type or a CMOS (Complementary Metal Oxide Semiconductor) type to converge light from an object to a photosensitive element, to form an image of the object and display the image on a display device.

Furthermore, the camera module is manufactured to enable a focus adjustment for adjusting a size of an image, where a driving source is installed and a plurality of lenses is moved to change a relative distance for adjustment of an optical focal length.

The miniaturized and low power-consuming camera module is difficult to be applied with technique of VCM used to be applied with the conventional camera module, such that many attempts have been waged to overcome this disadvantages thus mentioned.

DISCLOSURE OF INVENTION

Technical Problem

Accordingly, embodiments of the present invention may relate to a camera module that substantially obviates one or more of the above disadvantages/problems due to limitations and disadvantages of related art, and it is an object of the present invention to provide a camera module configured to prevent a warp of an optical axis of a lens holder.

Technical problems to be solved by an exemplary embodiment of the present invention are not restricted to the above-mentioned, and any other technical problems not mentioned so far will be clearly appreciated from the following description by skilled in the art.

Solution to Problem

In order to accomplish the above object, an exemplary embodiment of the present invention provides a camera module, the camera module comprising: a PCB (Printed Circuit Board) mounted with an image sensor; a base; a first lens holder arranged at an upper surface of the base and including at least one or more lens modules therein; a second lens holder forming an outer cover of the first lens holder; and an actuator concentrically arranged with an optical axis of the lens module for adjusting a focus of an image captured by the image sensor.

Preferably, but not necessarily, the camera module comprising an electronic circuit pattern layer formed by a surface conductive pattern forming technology Preferably, but not necessarily, the actuator performs an auto focusing by moving one sheet of lens.

Preferably, but not necessarily, the actuator performs a hand-shake correction function.

Preferably, but not necessarily, the lens is an outmost lens.

Preferably, but not necessarily, the actuator is any one of a micro actuator, a liquid crystal lens, a non-micro actuator including a piezo polymer lens, a silicone type actuator and a liquid lens.

Preferably, but not necessarily, the camera module comprising an optical mechanism interposed between an outmost lens supported by the actuator and a lens module facing the outmost lens.

Preferably, but not necessarily, the optical mechanism is formed at a space interposed between the image sensor and the lens module facing the image sensor.

Preferably, but not necessarily, the optical mechanism is formed at a space interposed among a plurality of lenses forming the lens module.

Preferably, but not necessarily, the second lens holder is secured by an adhesive coated on a surface contacting the base at a predetermined height.

Preferably, but not necessarily, the adhesive is an epoxy resin.

Preferably, but not necessarily, the second lens holder is actively aligned relative to the image sensor.

Preferably, but not necessarily, the first and second lens holders are co-injection molded.

Preferably, but not necessarily, the first and second lens holders are installed inside a camera housing.

Preferably, but not necessarily, the first and second lens holders are respectively formed with mutually different materials.

Preferably, but not necessarily, the first and second lens holders are respectively formed with same materials.

Preferably, but not necessarily, the second lens holder is concentrically formed with a center of the first lens holder.

Preferably, but not necessarily, the second lens holder is formed on a surface thereof with an electronic circuit pattern layer, one end of the electronic circuit pattern layer being connected to the base, and the other end of which being connected to the actuator.

Preferably, but not necessarily, the second lens holder is formed on a surface thereof with an electronic circuit pattern layer, one end of the electronic circuit pattern layer being connected to the second lens holder, and the other end of which being connected to the PCB.

Advantageous Effects of Invention

A camera module according to an exemplary embodiment of the present invention has an advantageous effect in that a plurality of lenses is secured and supported by a first lens holder and a second lens holder forming an outer cover formed with an electronic circuit pattern layer at an outer cover of the first lens holder, to simplify a structure of a lens holder and to maintain a high performance of the camera module at the same time.

Another advantage is that a sufficient adhesive coating space for active alignment is secured to accomplish an optical performance and productivity of product. That is, in a case a sufficient adhesive coating space is obtained, a height for obtaining a sufficient adhesive coating capable of performing the active alignment can be secured to enhance strength by enlarging a bonding space between two objects to be adhered.

Still another advantage is that an active alignment is performed, while a lens module is bonded to an upper surface of a base after the base is first securely coupled, to thereby prevent foreign objects from entering an image sensor side during the active alignment process and to enhance a substrate holding capability for active alignment.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
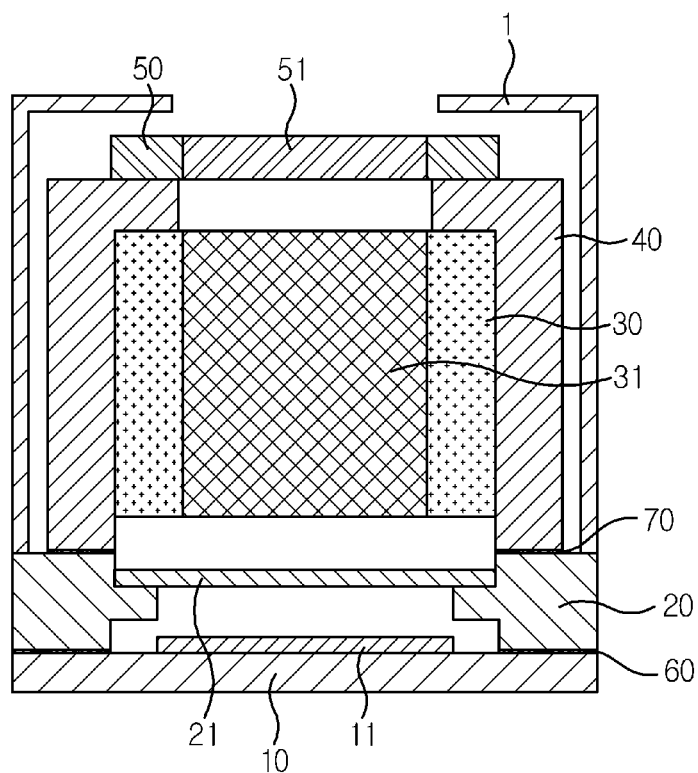
FIG. 1 is a cross-sectional view illustrating a camera module according to an exemplary embodiment of the present invention.
Figure 2:
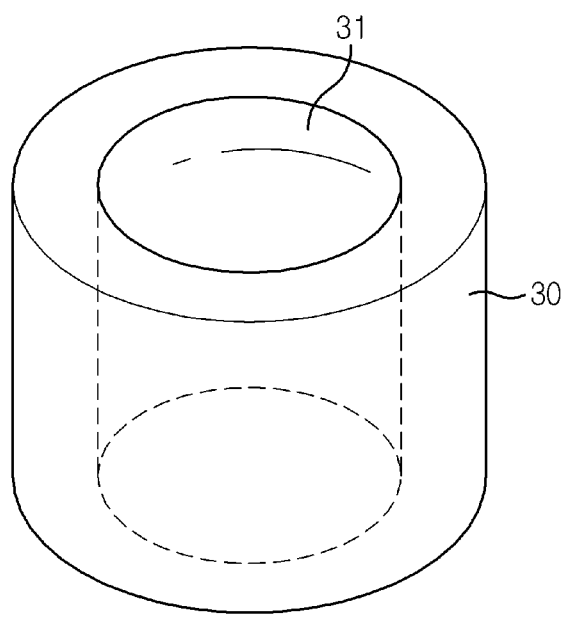
FIG. 2 is a perspective view illustrating a first lens holder of FIG. 1.
Figure 3:
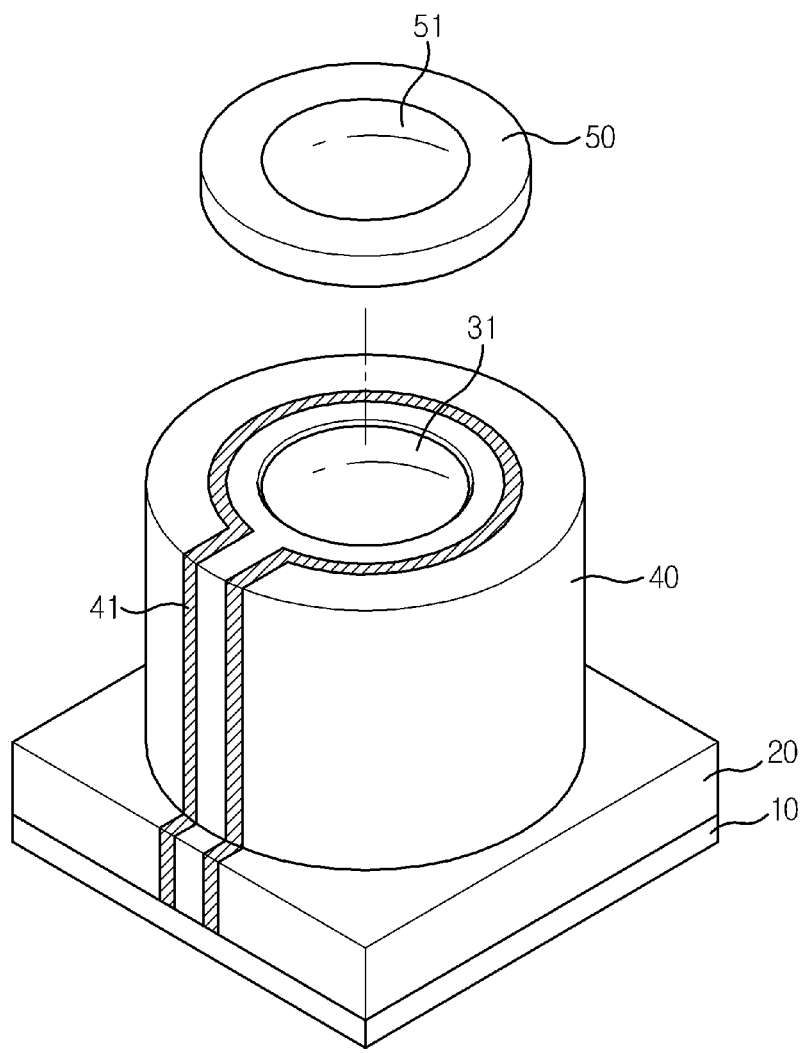
FIG. 3 is an exploded perspective view illustrating a state where an outer cover is co-injection molded on the first lens holder of FIG. 2 to couple an actuator to a PCB.

The disclosed embodiments and advantages thereof are best understood by referring to FIGS. 1-3 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the camera module according to exemplary embodiments of the present invention will be described in detail with reference to the accompanying drawings.

FIG. 1 is a cross-sectional view illustrating a camera module according to an exemplary embodiment of the present invention, FIG. 2 is a perspective view illustrating a first lens holder of FIG. 1, and FIG. 3 is an exploded perspective view illustrating a state where an outer cover is co-injection molded on the first lens holder of FIG. 2 to couple an actuator to a PCB.

Referring to FIG. 1, the camera module according to an exemplary embodiment of the present invention may include a camera housing (1), a PCB (10) formed inside the camera housing (1), a base (20), first and second lens holders (30, 40) and an actuator (50).

The camera housing (1) may be provided in a substantially box shape, and an opening may be provided at an approximate center of the camera housing (1), where the camera housing (1) may be configured to transmit a pictorial image to a PCB (10) side.

The PCB (10) is mounted at an upper surface with an image sensor (11) and may be mounted at a bottom surface of the first and second lens holders (30, 40) discrete at a predetermined distance. An opposite surface of the surface formed with the image sensor (11) of the PCB (10) may be conductively mounted with an F-PCB (Flexible PCB, not shown). The PCB (10) may supply power to the image sensor (11) and output an image data read out from the image sensor (11) to a predetermined controller.

Meanwhile, the F-PCB may be configured to supply a control signal and a power to an actuator (50). The base (20) is coupled to an upper surface of the PCB (10) by using an adhesive (60) such as epoxy resin, and may be centrally formed with a window at a position corresponding to that of the image sensor (11). The window may be mounted with an IRCF (infrared cut-off filter, 21) preventing infrared from entering the image sensor (11).

The first lens holder (30) is centrally formed with an empty space, and the space may be preferably mounted with a lens module (31) formed with at least one or more sheets of lenses. The first lens holder (30) may be injection-molded with resin material using a material of a lens holder used in a conventional camera module.

Meanwhile, an optical mechanism such as a shutter or a diaphragm may be formed in the lens module (31) mounted at the first lens holder (30). For example, in a case a plural sheet of lenses is sequentially arranged at the first lens holder (30), the diaphragm and the shutter may be mounted in an inner space of the lens module (31) formed with the plural sheet of lenses, or may be mounted at an uppermost end of the lenses in an opened state, or may be arranged at a space between a rearmost lens (not shown) and the image sensor (11), if necessary. These arrangements may be changeable depending on product design and configuration of camera unit.

The second lens holder (40) may become an outer cover of the first lens holder (30). A method of forming the second lens holder (31) may be variably configured, and according to an exemplary embodiment of the present invention, the second lens holder (40) may be formed by using a co-injection molding method using a mold. In this case, the first lens holder (30) supporting the lens module (31) is first formed, and the second lens holder (40) is co-injection molded to become an outer cover of the first lens holder (30) to increase accuracy of the first lens holder (30), whereby the second lens holder (40) can be configured to form an electronic circuit pattern layer (41, described later).

At this time, the first and second lens holders (30, 40) may be formed with the same material, or may be formed with a different material. Meanwhile, a surface of the second lens holder (40) may be integrally formed with the electronic circuit pattern layer (41), whereby a control signal and a power to be transmitted to the PCB (10) can be transmitted to the actuator (50) free from a separate connection member.

Meanwhile, referring to FIG. 1, the second lens holder (40) may be secured to an upper surface of the base (20) at a predetermined height by using an adhesive (70) such as epoxy resin. At this time, an active alignment is performed while securing the second lens holder (40) to perform an optical alignment between the lens module (31) and the image sensor (11) mounted at an inside of the second lens holder (40). In a case the base (20) is first fixed at the upper surface of the PCB (10), an active alignment is performed, and the first and second lens holders (30, 40) are fixed relative to the base (20), foreign objects such as dust are prevented from entering the image sensor during the actual alignment operation, and the adhesive can be coated at a sufficient height to secure the first and second lens holders (30, 40) to the upper surface of the base (20), whereby adhesion between the base (20) and the first and second lens holders (30, 40) can be reinforced.

Meanwhile, although only the second lens holder (40) is secured to the base (20) in FIG. 1 using the adhesive (70) of epoxy resin according to an exemplary embodiment of the present invention, the configuration is not limited thereto, and if necessary, the first and second lens holders (30, 40) may be fixed at the same time using the adhesive (70).

The electronic circuit pattern layer (41) formed on the surface of the second lens holder (40) serves to transmit a control signal and an electric power to the actuator (50) relatively distanced from the PCB (10), and in a case the electronic circuit pattern layer (41) is formed on the surface of the second lens holder (40), the actuator (50) can be directly mounted on the second lens holder (40) without the assistance of separate connection part such as a CF-PCB, or the electronic circuit pattern layer (41) and the actuator (50) can be directly and conductively connected through a bonding process only using a conductive adhesive.

The technique of integrally forming the electronic circuit pattern layer (41) on the surface of the second lens holder (40) is generally called an a surface conductive pattern forming technology, which may largely be classified into three types.

1st method is a patterning method through over-molding which is a process that is used in manufacturing forms to create parts and improve product efficiency. That is, the over-molding or two-shot molding is an injection molding process using two separate molds of which one material is molded over another material.

2nd method is such that the electronic circuit pattern layer (41) is formed, using surface patterning work such as laser exposure while impurities reacting to light and heat is included inside a material forming the second lens holder (40).

3rd Method is a method in which a front is metalized to etch a non-circuit part and to pattern.

The technique of integrally forming the electronic circuit pattern layer (41) on the surface of the second lens holder (40) may be one of these three methods.

The actuator (50) may be directly connected to the electronic circuit pattern layer (41) formed on the surface of the second lens holder (40), and according to the exemplary embodiment of the present invention, the actuator (50) is configured by an micro actuator to allow at least one sheet of lens (51) to reciprocate to a direction parallel to an optical axis, whereby the auto focusing function can be performed.

Furthermore, the actuator (50) may be configured in such a manner that one sheet of lens (51) is shifted and tilted relative to the optical axis to perform a hand-shake correction (i.e., Optical Image Stabilization) function, or to perform the hand-shake correction and auto focusing functions together. At this time, the shifting direction is horizontal and vertical directions relative to a surface perpendicular to an optical axis of incident light.

That is, the actuator (50) may be one of micro actuator using electrostatic force and piezoelectric force capable of moving one sheet of lens, a micro piezo actuator, a micro bimorph actuator, a micro thermal actuator, a micro magnetic actuator, a micro liquid actuator, a non-micro type actuator, a silicone type actuator and a liquid lens. The actuator (50) may be any actuator formed by combination thereabove.

Mode for the Invention

As noted from the foregoing, in a case a co-injection molding of the second lens holder (40) using the first lens holder (30) of the conventional barrel type as a core, and the first lens holder (30) as an outer cover, there will be no problem of such instances where the lens module (31) is warped in the course of forming the electronic circuit pattern layer (41) or concentricity of lenses forming the lens module (31) is disoriented, such that an effective and miniaturized camera module can be manufactured while maintaining the same accuracy as that of the conventional camera module.

Meanwhile, if necessary, material of the second lens holder (40) may be same as or different from that of the first lens holder (30).

As apparent from the foregoing, the base (20) and the first/second lens holders (30, 40) are manufactured with mutually different materials, and the first/second lens holders (30, 40) are actively aligned on an upper surface of the base (20) after the easily-contaminated image sensor (11) is air-tightly sealed through fixture using an adhesion of the base (20), such that the image sensor (11) can be prevented from being contaminated during the active alignment process to allow coating the adhesive (70) at a sufficient height and performing the active alignment of the lens module (31) more accurately.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to an exemplary embodiment of the present invention has an industrial applicability in that it is a useful technology that can be applied to a miniaturized camera module used for less-voluminous portable electronic parts, and usefully applied to where there is a small space for wiring, although there is a need of electrically connecting a plurality of electronic parts.

The invention claimed is:

1. A camera module, the camera module comprising:
a PCB (Printed Circuit Board);
an image sensor disposed on an upper surface of the PCB;
a base disposed on the upper surface of the PCB;
a lens module disposed over the image sensor;
a first lens holder disposed at an upper side of the base and coupled with the lens module;
a second lens holder disposed on an upper surface of the base;
an actuator disposed on the second lens holder over the lens module to adjust an image captured by the image sensor;
an electronic layer disposed along an outer surface of the second lens holder and electrically connected to the actuator;
a filter disposed on the base between the lens module and the image sensor; and
a camera housing comprising an upper plate disposed over the actuator and having a through hole disposed at a position corresponding with that of the lens module and a lateral plate downwardly extended from the upper plate,
wherein a bottom end of the lateral plate is disposed on the upper surface of the base,
wherein the first and second lens holders are respectively formed with mutually different materials,
wherein the outer surface of the second lens holder is spaced apart from an inner surface of the lateral plate,
wherein an upper surface of the filter is disposed lower than the upper surface of the base,
wherein an outer lateral surface of the first lens holder is surface-contacted with an inner lateral surface of the second lens holder, an upper surface of the first lens holder is surface-contacted with an inner surface of the second lens holder and a bottom surface of the first lens holder is downwardly opened, and
wherein a portion of the second lens holder is disposed between the actuator and the first lens holder, and the portion of the second lens holder is overlapped with the actuator and the first lens holder in a direction corresponding to an optical axis.

2. The camera module of claim 1, wherein the electronic layer is formed by a surface conductive pattern forming technology.

3. The camera module of claim 2, wherein the actuator performs an auto focusing by moving one lens.

4. The camera module of claim 3, wherein the actuator performs a hand-shake correction function.

5. The camera module of claim 3, wherein the lens moved by the actuator is an outmost lens.

6. The camera module of claim 5, wherein the actuator includes any one of a micro actuator, a liquid crystal lens, a non-micro actuator including a piezo polymer lens, a silicone type actuator and a liquid lens.

7. The camera module of claim 1, further comprising an optical mechanism interposed between an outmost lens supported by the actuator and the lens module facing the outmost lens.

8. The camera module of claim 1, further comprising an optical mechanism interposed between the image sensor and the lens module.

9. The camera module of claim 1, further comprising an optical mechanism interposed among a plurality of lenses forming the lens module.

10. The camera module of claim 1, wherein the second lens holder is secured by an adhesive coated on a surface contacting the base at a predetermined height.

11. The camera module of claim 10, wherein the adhesive is an epoxy resin.

12. The camera module of claim 10, wherein the second lens holder is actively aligned relative to the image sensor.

13. The camera module of claim 1, wherein the first and second lens holders are co-injection molded.

14. The camera module of claim 1, wherein the first and second lens holders are disposed inside the camera housing.

15. The camera module of claim 1, wherein the second lens holder is concentrically formed with a center of the first lens holder.

16. The camera module of claim 1, wherein the electronic layer is formed with one end of the electronic layer being connected to the base, and the other end of the electronic layer being connected to the actuator.

17. The camera module of claim 1, wherein the base comprises an electronic layer formed along an outer surface of the base, and
wherein one end of the base is connected to the second lens holder and the other end of the base is connected to the PCB.

18. The camera module of claim 1, wherein the second lens holder is formed by a co-injection molding using the first lens holder as a core.

* * * * *